US008284023B2

(12) United States Patent
Coutermarsh et al.

(10) Patent No.: US 8,284,023 B2
(45) Date of Patent: Oct. 9, 2012

(54) INTERNAL LOCKING APPARATUS AND METHODS FOR MAKING AND USING SAME

(75) Inventors: Richard Alfred Coutermarsh, Kingwood, TX (US); John Reid Eastman, Kingwood, TX (US)

(73) Assignee: Inner Loc, LLC, Houston, TX (US)

( * ) Notice: Subject to any disclaimer, the term of this patent is extended or adjusted under 35 U.S.C. 154(b) by 688 days.

(21) Appl. No.: 11/526,925

(22) Filed: Sep. 26, 2006

(65) Prior Publication Data

US 2007/0109097 A1 May 17, 2007

(51) Int. Cl.
*B60R 25/00* (2006.01)

(52) U.S. Cl. ........................................ 340/5.73; 70/277

(58) Field of Classification Search ................. 340/5.73, 340/5.7, 5.2, 5.1, 5.6, 825; 70/277, 275, 70/266

See application file for complete search history.

(56) References Cited

U.S. PATENT DOCUMENTS

| | | | | |
|---|---|---|---|---|
| 4,499,462 | A * | 2/1985 | Stoesser et al. | 340/5.51 |
| 5,055,658 | A | 10/1991 | Cockburn | |
| 5,701,828 | A * | 12/1997 | Benore et al. | 109/56 |
| 5,704,008 | A | 12/1997 | Duvall, Jr. | |
| 5,755,126 | A * | 5/1998 | Lanigan et al. | 70/257 |
| 5,781,399 | A | 7/1998 | Lanigan et al. | |
| 5,790,034 | A * | 8/1998 | Khoury | 340/5.64 |
| 5,791,702 | A | 8/1998 | Liroff | |
| 5,806,355 | A | 9/1998 | Lanigan et al. | |
| 5,857,721 | A | 1/1999 | Liroff | |
| 5,917,423 | A | 6/1999 | Duvall | |
| 5,931,033 | A | 8/1999 | Lanigan et al. | |
| 6,046,681 | A * | 4/2000 | Solop | 340/5.26 |
| 6,047,576 | A | 4/2000 | Lanigan et al. | |
| 6,049,448 | A | 4/2000 | Lanigan et al. | |
| 6,050,116 | A | 4/2000 | Cole | |
| 6,113,163 | A | 9/2000 | Liroff | |
| 6,229,988 | B1 | 5/2001 | Stapefeld et al. | |
| 6,282,931 | B1 * | 9/2001 | Padiak et al. | 70/279.1 |
| 6,331,022 | B1 | 12/2001 | Liroff | |
| 6,536,815 | B1 | 3/2003 | Liroff | |
| 6,550,829 | B1 | 4/2003 | Dobson | |
| 6,634,721 | B2 | 10/2003 | Holt | |
| 6,665,613 | B2 | 12/2003 | Duvall | |
| 6,725,158 | B1 | 4/2004 | Sullivan et al. | |
| 6,737,962 | B2 | 5/2004 | Mayor | |
| 6,844,829 | B2 | 1/2005 | Mayor | |
| 6,847,825 | B1 | 1/2005 | Duvall et al. | |
| 6,870,476 | B2 | 3/2005 | Cockburn et al. | |
| 6,876,858 | B1 | 4/2005 | Duvall et al. | |

(Continued)

FOREIGN PATENT DOCUMENTS

| | | |
|---|---|---|
| WO | WO2004033322 | 4/2004 |

OTHER PUBLICATIONS

Pages from www.mjst.com/Security_Solutions.htm (pages attached).

(Continued)

*Primary Examiner* — Brian Zimmerman
*Assistant Examiner* — An T Nguyen
(74) *Attorney, Agent, or Firm* — Robert W. Strozier

(57) ABSTRACT

An internal locking system is disclosed, which utilizes electromechanical locking devices to lock and unlock lockable openings.

5 Claims, 9 Drawing Sheets

U.S. PATENT DOCUMENTS

| | | | | |
|---|---|---|---|---|
| 6,982,643 | B2 | 1/2006 | Garfinkle | |
| 7,010,066 | B2 | 3/2006 | Sullivan et al. | |
| 7,020,190 | B2 | 3/2006 | Sullivan | |
| 7,027,486 | B2 | 4/2006 | Sullivan | |
| 7,038,785 | B2 | 5/2006 | Hall et al. | |
| 7,051,561 | B2 * | 5/2006 | Moon et al. | 70/283.1 |
| 7,053,823 | B2 | 5/2006 | Cervinka et al. | |
| 7,063,362 | B1 | 6/2006 | Liroff | |
| 7,091,857 | B2 | 8/2006 | Lanigan et al. | |
| 7,106,211 | B2 | 9/2006 | Duvall | |
| 7,339,473 | B2 * | 3/2008 | Lucas | 340/545.1 |
| 7,446,644 | B2 * | 11/2008 | Schaffzin et al. | 340/5.6 |
| 8,022,573 | B2 * | 9/2011 | Powers et al. | 307/66 |
| 2001/0050509 | A1 | 12/2001 | Holt | |
| 2003/0112118 | A1 * | 6/2003 | Raslan | 340/5.2 |
| 2003/0160681 | A1 * | 8/2003 | Menard et al. | 340/5.64 |
| 2004/0045330 | A1 * | 3/2004 | Moon et al. | 70/107 |
| 2004/0055345 | A1 * | 3/2004 | Moore | 70/257 |
| 2004/0143392 | A1 | 7/2004 | Kilfeather et al. | |
| 2004/0155477 | A1 | 8/2004 | Lanigan et al. | |
| 2004/0204969 | A1 | 10/2004 | Wu | |
| 2005/0062344 | A1 | 3/2005 | Holt et al. | |
| 2005/0099262 | A1 * | 5/2005 | Childress et al. | 340/5.6 |
| 2005/0171695 | A1 | 8/2005 | Sullivan et al. | |
| 2005/0179546 | A1 * | 8/2005 | Lanigan et al. | 340/545.6 |
| 2005/0219037 | A1 | 10/2005 | Huang | |
| 2005/0231365 | A1 | 10/2005 | Tester et al. | |
| 2006/0033616 | A1 | 2/2006 | Silva et al. | |
| 2006/0071786 | A1 | 4/2006 | Fano | |
| 2006/0117820 | A1 | 6/2006 | Lanigan et al. | |
| 2006/0164208 | A1 * | 7/2006 | Schaffzin et al. | 340/5.64 |
| 2006/0164235 | A1 | 7/2006 | Gounder | |
| 2006/0198427 | A1 | 9/2006 | Sullivan | |
| 2006/0220847 | A1 | 10/2006 | Lanigan et al. | |
| 2006/0290147 | A1 | 12/2006 | Liroff | |
| 2007/0080802 | A1 | 4/2007 | Cockburn et al. | |
| 2007/0176437 | A1 * | 8/2007 | Marschalek et al. | 292/347 |
| 2007/0230926 | A1 * | 10/2007 | Mehlhorn | 388/811 |
| 2010/0031714 | A1 * | 2/2010 | Brown et al. | 70/91 |

OTHER PUBLICATIONS

Pages from www.hoc-loc.com (attached).
"Warning Says Violent Cargo Theft on Rise for U.S: Worldwide cargo theft estimated to be worth $50B a year, and increasing risks of violent thefts," NewsEdge Corporation, Oct. 10, 2006.
Scott Greiper and Mark Sauter, "Beyond Aviation: The Emerging Ground Transportation Security Market," Sep. 2006, Legend Merchant Group.
Sean Kilcarr, "Cargo theft a growing threat," Drivers, Oct. 10, 2002.
Alex Ortolani and Robert Block, "Hong Kong port project hardens container security," The Wall Street Journal, Jul. 29, 2005.
http://findarticles.com/p/articles/mi_m0EIN/is_2004_Sept_13/ai_n6190149.
GE references: four attached pdfs from their website re CommerceGuard and VeriWise products.
Safefrieght webpages.
SC Integrity.
Sealock.
SkyBitz, Inc.
TransCore.
Transport Security's ENFORCER GPS system.
Wireless Matrix.
Lawrence_Livermore_2005_conference_abstract_316488.
NSSN search results.
Cargo_Theft_Prevention_A_Handbook_for_Logistics_Security.
Tapa_FSR_and_TSR_Downloads.

* cited by examiner

INTERNAL LOCKING APPARATUS AND METHODS FOR MAKING AND USING SAME

RELATED APPLICATIONS

This application claims priority of U.S. patent application Ser. No. 11/509,333 filed Aug. 24, 2006, which claims priority to U.S. Provisional Patent Application Ser. No. 60/710,755, filed Aug. 24, 2005.

BACKGROUND OF THE INVENTION

1. Field of the Invention

The present invention relates to an apparatus for locking containers from the inside and to methods for making and using same.

More particularly, the present invention relates to an apparatus for locking containers from the inside, where the apparatus locking assembly selected from the group consisting of worm screw drives, linear actuator drives, cam drive, or the like, and a remotely accessible control assembly and to methods for making and using same.

2. Description of the Related Art

Although most doors are locked on the outside using a variety of locking mechanisms, such outside locking devices are prone to unwanted and/or unlawfully enter either by tampering with the locking mechanism or destroying the locking mechanism.

In recent years, several devices have been developed to lock containers from the inside, where the locking mechanism is activated from the outside by a tough pad or some type of remote activation device. The two systems currently known in the art are a pneumatic device and an electrical device. The pneumatic device is described in PCT published patent application WO2004033322. The electrical device is described at the web site:

Even though a recent trend toward internal locking mechanisms is making in roads into the industrial industries, there is still a need in the art for internal locking mechanisms that are simple to operate, are compact and are reliable.

SUMMARY OF THE INVENTION

The present invention provides an internal locking apparatus including a locking system and an electronic control system, where the locking system includes a locking assembly selected from the group consisting of a worm screw drive, a linear actuator drive, a cam drive or the like, where the locking system is designed to be mounted inside a container and the locking assembly is designed to transition between a locked position and an unlocked position, which locks or unlocks a lockable opening such as an opening of container, room, storage chamber, etc. The electronic control system is designed to provide power to the locking system to change its state from the locked position to the unlocked position or vis-a-versa.

The present invention also provides an apparatus including a plurality locking systems and an electronic control system, where the locking system includes a locking assembly selected from the group consisting of a worm screw drive, a linear actuator drive, a cam drive or the like, where the locking system is designed to be mounted inside a container and the locking assembly is designed to transition between a locked position and an unlocked position, which locks or unlocks a lockable opening such as a container door. The electronic control system is designed to provide power to the locking systems to change their state from the locked position to the unlocked position or vis-a-versa.

The apparatus can also include a plurality of locking systems. In the case of apparatuses that include multiple locking systems, each locking system will have its own drive. When the locking systems are independently controlled, then security is higher, but manual locking and/or unlocking are more time consuming. Of course, if the locking systems are controlled via telemetry (Rf, IR, nearIR, sonic, microwave, radar, etc.), then each locking system can be on a separate frequency, have a separate code or a combination, thereof to further increase security, yet not slowing down locking and unlocking operations.

The present invention provides a method for locking a door or an opening including the step of mounting a locking system of this invention on an inner surface of a door or opening or an inner surface of a wall adjacent the door or opening. Once the locking system is mounted, a power source mounted on the inner surface of the door and/or in an interior of the container, room, cavity, compartment, or a similar enclosure in electrical communication with the locking system is installed. Once the system and the power source are mounted and installed, an electronic control system is installed within the interior and connected to the locking system. The electronic control system includes a command generator component for causing the locking system to transition from an unlocked position to a locked position or vis-a-versa. The electronic control system can also include a receiver component or unit capable of receiving an activation signal instructing the electronic control system to issue a command to the locking system(s) to cause the locking system(s) to transition between its (their) two states. The electronic control system can also include a transmitter component or unit, where the transmitter unit is capable of transmitting an authentication signal designed to authenticate the activation signal and is capable of transmitting a completion signal (which can be a success signal, a no success signal, an error signal or a no success signal and an error signal). The receiver component or unit is also capable of receiving a verification signal verifying the authenticity of the activation signal. The electronic control component can also include an external entry unit such as a keypad, touch pad or another encoded unit such as a finger print pad, a palm print pad, a retinal scanner, or other similar encoded unit, where the external unit is designed to generate a signal to transition the locking system between its locked and unlocked positions or vis-a-versa.

The method can also include the step of installing multiple locking systems and a single electronic control system or each locking system can have its own power supply and electronic control system. The method can also include sending and receiving signals from the single electronic control system or the individual electronic systems that cause the locking systems to transition between their locked and unlocked positions or vis-a-versa.

BRIEF DESCRIPTION OF THE DRAWINGS

The invention can be better understood with reference to the following detailed description together with the appended illustrative drawings in which like elements are numbered the same.

New Disclosure

Figure 4A:
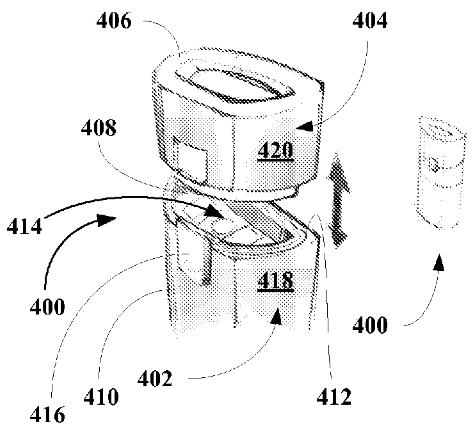
Figure 4B:
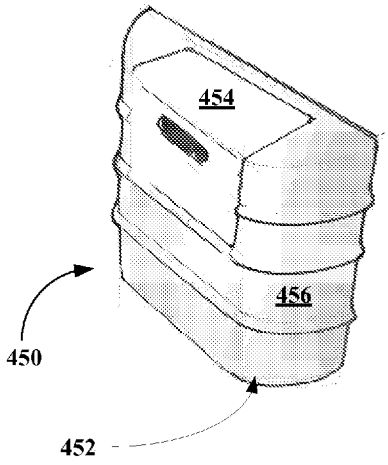
Figure 5:
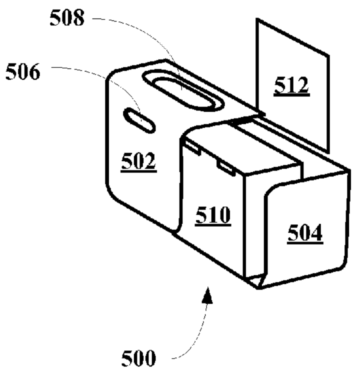

FIGS. 3A-D depict another embodiment of a container internal locking system of this invention and a photograph of the embodiment fully assembled;

FIGS. 4A-B depict two embodiment of an internal locking system of this invention;

FIGS. 5 depicts an embodiment of a battery pack for use in the invention; and

Figure 6:
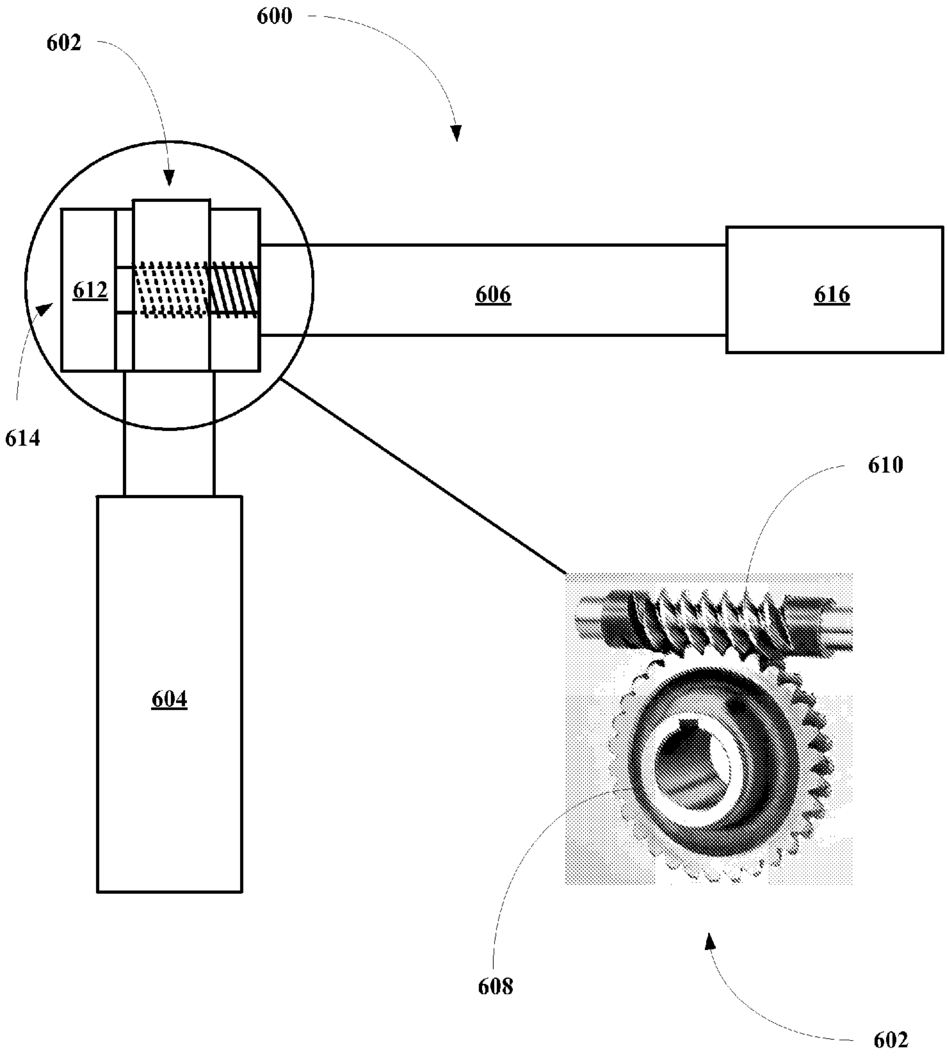

FIGS. 6 depicts an embodiment of a worm drive for use in the invention.

DETAILED DESCRIPTION OF THE INVENTION

The inventors have found that a locking apparatus for any container accessible by a door or an opening can be installed within an interior of the container, where the locking apparatus permits the door or opening to be locked from the inside so increase container security. The inventors have found that a electromechanical drive system provides superior performance, superior reliability, is compact and easily serviced.

The present invention broadly relates to an internal locking apparatus including a electro-mechanical locking system and an electronic control system. The locking system includes an electro-mechanical locking assembly and a source of electrical energy for powering in electrical communication with the locking assembly, while the electronic control system is in electrical communication with the locking system and controls the locking system. The locking assembly moves between a retracted position (an unlocked position) and an extended position (a locked position). The electronic control system includes a receiver and optionally a transmitter. The power supply and the drive are electrically connected to the electronic control system so that when a state transition signal is received by the electronic control system via its receiver, a signal is sent to the power supply and/or the drive to either extend or retract the locking member depending on its present state. Thus, if the locking member is extended, then the signal will cause the member to be retracted and vis-a-versa. The electronic control system can also include a transmitter which can be used to monitor the state of the lock, to verify the authentication of a received transition signal or to signal a successful change in state. The apparatus can also include an external unit in electrical communication with the electronic control system and is adapted to allow a person to enter a code directing the locking system to transition between it locked state and its unlocked state or between its unlocked state and its locked state.

The present invention broadly relates to a method for locking a container, room, cavity, chamber, etc. having an openable opening including the step of installing within the container, etc., an internal locking apparatus of this invention. The method also includes the step of issuing a signal to the electronic control system to transition the locking system from its unlocked to its locked position when the opening is in its closed state. The method also includes the step of issuing a second signal to the electronic control system to transition the locking system from its locked position to its unlocked position. The method can also include the steps of loading and unloading contents out of or into the container's interior once the opening is opened. The method can also include the step of monitoring the state of the locking system remotely during transportation. The method can also include the step of transmitting the transition signals from a remote location via a transmitter such as a satellite, cell phone or any other wireless communication protocol. The method can also include the step of entering a code on an external unit. The external unit then issues an instruction to the electronic control system to transition the locking system form one state to another state.

The locking systems of this invention can be a worm screw drive, a linear actuator drive, a cam drive or any other electromechanical locking device. If the apparatus includes a plurality of locking assemblies, then each of the locking system can be independently selected from a list of acceptable electromechanical locking devices or they can all be controlled collectively so that a single command will simultaneously, near simultaneously or sequentially unlock all of the independent locking devices.

In one embodiment, the internal locking apparatus of this invention includes a locking system adapted to be mounted in an interior adjacent an openable member of a container and to transition between a first state and a second state, a locked state and an unlocked state. The apparatus also includes an electronic control system includes a command generator component adapted generate commands to the locking system causing the locking system to transition between its two states, and a power supply adapted to provide electric power to the locking system and the electronic control system. The locking system is an electromechanical device, which can be selected from the group consisting of a worm screw drive, a linear actuator drive, a cam drive, and mixtures or combinations thereof.

The apparatus can also include a plurality of locking systems adapted to be mounted in the interior of the container in a spaced apart manner adjacent the openable member, where each locking system is capable of independently transitioning between a first state and a second state, a locked state and an unlocked state. The electronic control system can be adapted to issue commands to the plurality of locking systems to cause the locking systems to simultaneously or near simultaneously transition between their two states. The electronic control system can be adapted to issue commands to the plurality of locking systems to cause the locking systems to sequentially transition between their two states.

The container is selected from the group consisting of a truck trailer, a cargo container, a building, a room, and storage area and the openable member is a door.

The electronic control system can further include a receiver component capable of receiving an activation signal, where the activation signal causes the electronic control system to issue a state transition command to the locking system. The electronic control system can further include a transmitter component capable of transmitting a completion signal and optionally capable of transmitting on request, intermittently, periodically or continuously a status signal.

The electronic control system can further include a receiver component capable of receiving an activation signal and a verification signal, where the activation signal causes the command generator component to either issue a state transition command to the locking system or an authentication command and the verification signal causes the command generator component to issue a state transition command to the locking system, and a transmitter component capable of transmitting an authentication signal upon receiving an authentication command from the command generation component, where authentication signal is adapted to authenticate the activation signal.

The electronic control can further includes an external entry component where the external entry component is in communication with the other components of the electronic control system and is capable of generating a state transition signal to command generator component, causing the locking system to transition between its two states. The external entry component includes an authentication component for authenticating use of the external entry component. The authentication component comprises a key or touch pad having a unique authentication code, a finger print pad, a palm print pad, or a retinal scanner.

In another embodiment, the internal locking apparatus of this invention includes a plurality of locking systems, where each locking system includes a locking assembly and an electronic control system adapted to provide power to its locking assembly and to issue commands to its locking assembly causing its locking assembly to transition between its two states, and where the locking assemblies are adapted to be mounted in the interior of the container in a spaced apart manner adjacent the openable member and to transition between their locked states and their unlocked states.

In these embodiments, each electronic control system is controlled via telemetry. In certain embodiments, each electronic control system has a separate telemetry frequency, code or a combination thereof to further increase security, where the telemetry is selected from the group consisting of Rf telemetry, IR telemetry, nearIR telemetry, sonic telemetry, microwave telemetry, and radar telemetry. In these embodiments, the electronic control system transitions the plurality of locking systems between their first states and their second states simultaneously or near simultaneously, where near simultaneous means that the transition codes are generated over a short period of time generally less than 10 second. Alternatively, the electronic control system transitions the plurality of locking systems between their first states and their second states sequentially. Again, the container is selected from the group consisting of a truck trailer, a cargo container, room, and storage area and the openable member is a door.

The present invention also relates to a method for controlling assess to a container comprising the step of providing a locking apparatus. The locking apparatus includes a locking system mounted on an inner surface of the container adjacent an openable member and capable of transitioning between a locked state and an unlocked state. The locking apparatus also includes an electronic control system mounted on the same or different inner surface of the container and in electrical communication with the locking system. The electronic control system includes a command generation component adapted generate and send commands to the locking system causing the locking system to transition between its two states and a receiver component capable of receiving an activation signal adapted to cause the electronic system to issue a command to the locking system causing the locking system to transition between its two states. The locking apparatus also includes a power supply mounted on the same or different inner surface of the container in electrical communication with the locking system and the electrical control system and adapted to supply electric power to the two systems.

The method also includes the steps of sending an unlock signal to the electronic control system, issuing an unlock command to the locking system causing it to transition between its locked state and its unlocked state, loading the container, sending a lock signal to the electronic control system, and issuing a lock command to the locking system causing it to transition between its unlocked state and its locked state to communication with the locking system.

In certain embodiments, the method also includes the steps of transporting the container from a first location to a second location, issuing an unlock command to the locking system causing it to transition between its locked state and its unlocked state, and unloading the container.

In certain embodiments, the method also includes the steps of issuing an unlock command to the locking system causing it to transition between its locked state and its unlocked state, and unloading the container.

In certain embodiments, the electronic control system can further include a transmitting unit and the method further includes the steps of sending intermittent, periodic or continuous container status reports.

In certain embodiments, the method also includes the steps of sending an authentication signal after receiving a lock or unlock signal and receiving a verification signal.

In certain embodiments, the locking apparatus includes a plurality locking systems and a single electronic control system, where the locking systems are mounted adjacent th openable member in a spaced apart configuration.

In certain embodiments, the method includes a plurality of locking apparatuses, wherein the locking apparatuses are mounted adjacent th openable member in a spaced apart configuration and a controlled separately or collectively.

Suitable Materials

Suitable electromechanical drives for use in this invention include, without limitation, worm screw drives, linear actuator drives, cam type drives, rack and pinion drives or similar electro-mechanical drives manufactured by the following non-exclusive list of manufacturers: Motion Systems Corporation of Eatontown, N.J., Exlar Corporation of Chanhassen, Minn., Nook Industries, Inc. Of Cleveland, Ohio, Hoerbiger-Origa Corporation, North American corporate office, 100 West Lake Drive, Glendale Heights, Ill., California Linear Devices, Inc., 2236 Rutherford Road, Ste. 119, Carlsbad, Calif. 92008 USA, MACRON DYNAMICS, INC. of Horsham, Pa., Ultra Motion, 225 East Side Avenue, Mattituck, N.Y. 11952, Mechanical Components Pty Ltd, Aerotech, Inc., 101 Zeta Drive, Pittsburgh, Pa., Zero-Max, Inc. of Plymouth, Minn., Moog Components Group 1213 North Main Street, Blacksburg Va., Atlanta Drive Systems Inc., Wall, N.J., Bison Gear and Engineering Corp., St. Charles, Ill., Browning/Emerson Power Transmission, Ithaca, N.Y., Certified Reducer Rebuilders Inc., Madison Heights, Mich., DieQua Corp., Bloomingdale, Ill., Grupo M eusnier, S. A. de C. V. Naucalpan, Mexico, Milwaukee Gear Co., Milwaukee, Wis., Morse/Emerson Power Transmission, Ithaca, N.Y., Nissei Corporation Of America, Charlotte, N.C., Pamco Machine Works Inc., Monrovia, Calif., Philadelphia Gear Corp., Norristown, Pa., Premium Energy Transmission Limited, Pune, India, Quality Transmission Components, Garden City Park, N.Y., SEW-Eurodrive Inc., Lyman, S.C., Stock Drive Products, New Hyde Park, N.Y., Supreme Gear, Fraser, Mich., Torque Transmission, Fairport Harbor, Ohio, Tsubakimoto Chain Co., ASI Technologies Inc., Akron Gear and Engineering, American Gear & Engineering, Amko Gears (India), Atelier Vanhoute, Atlanta Drive Systems Inc., Bison Gear and Engineering Corp., Bodine Gear Manufacturing, Browning/Emerson Power Transmission, Certified Reducer Rebuilders Inc, Chenta Gear—USA, Cleveland Gear Co., Davall Gears, Delroyd Worm Gear, DieQua Corp., Electra-Gear, Elmrad Engineering Co. Pvt. Ltd., Engineered Technical Systems, FRAN SA de CV, Flender Corp., Foote-Jones, A Regal-Beloit Company, Forest City Gear Co., Gear Products Inc., Gibbs Gears Precision Engineers Ltd., Great Taiwan Gear, Grupo Meusnier, S. A. de C. V., High Power Gear Co., Hub City Inc., Jankat Gear and Machine, Milwaukee Gear Co., Morse/Emerson Power Transmission, NAMCO, Nissei Corporation Of America, Ontario Drive & Gear Ltd., Pamco Machine Works Inc., Peerless-Winsmith Inc, Penn Machine Co., Philadelphia Gear Corp., Premier Machine & Gear Ltd., Premium Energy Transmission Limited, Quality Gears, Quality Transmission Components, Rino Industries Ltd., S. P. Enterprise, SEW-Eurodrive Inc., SSJ Italy, Shanthi Gears, Stock Drive Products, Supreme Gear, Textron Power Transmission, Torque Transmission, Tsubakimoto Chain Co., or the like or mixtures or combinations thereof.

Suitable power supplies for use with the present invention include, without limitation, an DC battery, solar panels, AC power sources with DC converters, generators, alternators or other electrical systems that generate sufficient DC power to operate the drives and other electronic components of the locking apparatuses of this invention.

Suitable electronic control systems for use in this invention include, without limitation, electronic control systems from HYVAIR, Inc. which are keyless activated with remote units and operate at 300 MHz and have secure activation codes. The electronic control systems include a digital processing unit, a memory, an optional mass storage device, an operating system installed in the memory, communication hardware and software, and analog to digital conversion components if needed. The digital processing unit can be any digital processing unit sufficient to receive control signals and generate commands that cause the locking systems to transition between their two states.

Suitable external control units for use in this invention include, without limitation, keypads, touch pads, voice-activated device or any other electronic device that can receive a code, verify the code, generate an action signal and transmit the action signal. The electronic devices can also include a retinal scanner, a finger print scanner, a palm print scanner or other identification device.

Suitable receivers for use in this invention include, without limitation, Rf receivers, ultrasound receivers, microwave receivers, IR receivers, near IR receivers, radar receivers, laser receivers, or the like or mixtures or combinations thereof.

Suitable transmitters for use in this invention include, without limitation, Rf transmitters, ultrasound transmitters, microwave transmitters, IR transmitters, near IR transmitters, radar transmitters, lasers or the like or mixtures or combinations thereof.

DETAILED DESCRIPTION OF DRAWINGS

Figure 1A:
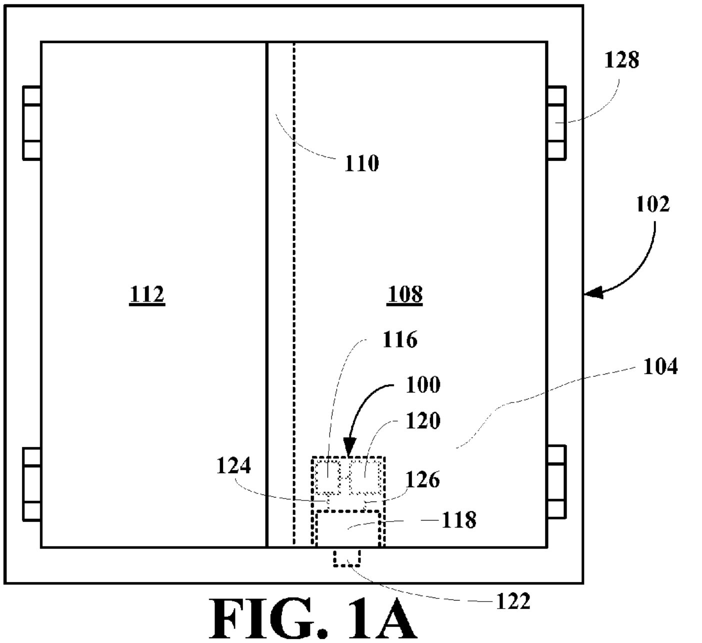
FIGS. 1A&B depict an embodiment of a container internal locking system of this invention.

Referring now to FIGS. 1A&B, a preferred embodiment of an internal locking apparatus, generally 100, is shown. The apparatus 100 is mounted within a container 102 on an inner surface 104 of a double door 106, where one door 108 has a lip 110 that does not allow the other door 112 to be opened until and unless the first door 108 is opened first. The apparatus 100 includes a housing 114. Within the housing 114, the apparatus 100 includes a power supply 116, an electro-mechanical system 118 and an electronic control system 120. The electro-mechanical system 118 includes a retractable locking member 122, shown here extended into an aperture 123 in the container 102. The power supply 116 is connected to the electro-mechanical system 118 via a first electrical conduit 124. The electro-mechanical system 118 is connected to the electronic system 120 via a second electrical conduit 126. The doors 108 and 112 are mounted on the container 102 via hinges 128. The container 102 can be a truck trailer, a cargo container (ship, rail or storage container), a building, a room, storage area, or the like.

Figure 1B:
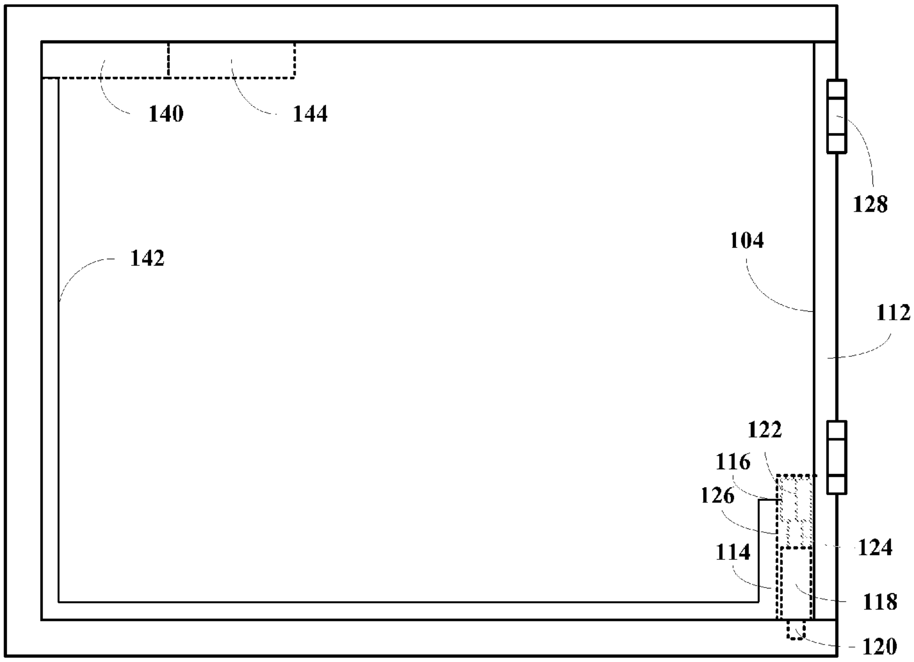
FIGS. 1C&D depict another embodiment of a container internal locking system of this invention.
FIGS. 1E&F depict another embodiment of a container internal locking system of this invention.
Figure 1C:
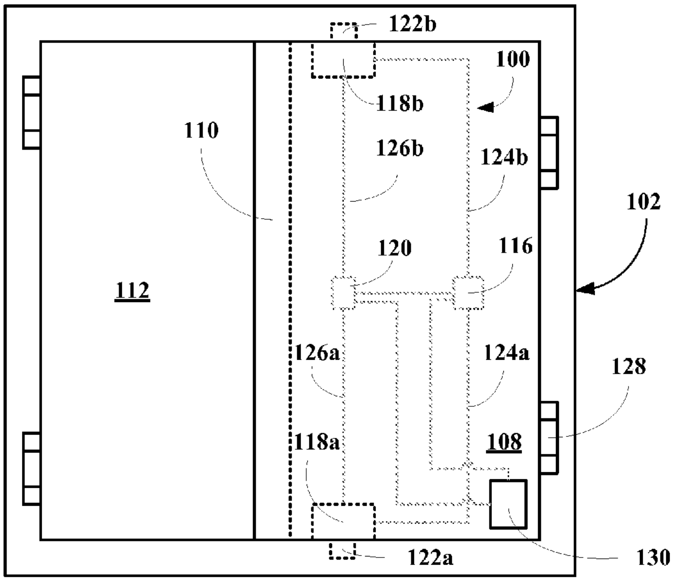
Figure 1D:
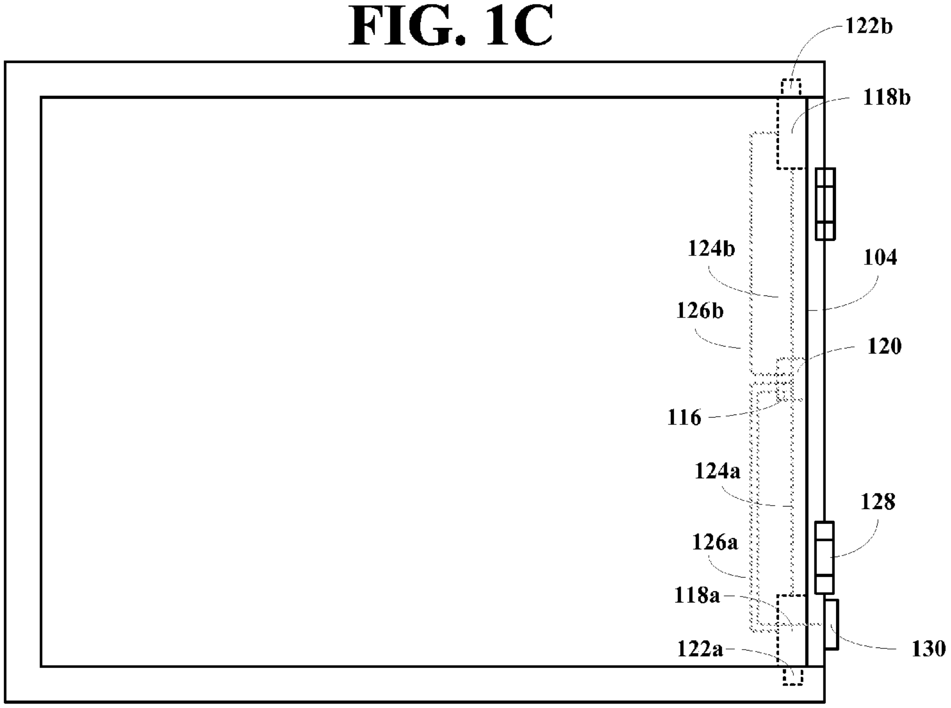

Referring now to FIGS. 1C&D, another preferred embodiment of an internal locking apparatus, generally 100, is shown. The apparatus 100 is mounted within a container or room or the like 102 on an inner surface 104 of a double door 106, where one door 108 has a lip 110 that does not allow the other door 112 to be opened until and unless the first door 108 is opened first. The apparatus 100 includes a power supply 116, two electro-mechanical systems 118*a&b*, and an electronic control system 120. Each electro-mechanical system 118*a* or *b* includes a retractable locking member 122*a&b*, shown here extended into apertures 123*a&b* in the container 102. The power supply 116 is connected to the electro-mechanical systems 118*a&b* via first electrical conduits 124*a&b*. The electro-mechanical systems 118*a&b* is connected to the electronic system 120 via second electrical conduits 126*a&b*. The doors 108 and 112 are pivotally mounted on the container 102 via hinges 128. The apparatus 100 can also include an external electronic unit 130 in electrical communication with the electronic control system 120 and to the power supply 116 via electrical wires 132 and 134 and where the external electronic unit 130 is adapted to allow a person to enter a code to direct the electronic control system 120 to cause the electro-mechanical systems 118*a&b* to transition between their two states. The container 102 can be a truck trailer, a ship cargo container, a storage room, or the like.

In this embodiment, the two electromechanical systems 118*a&b* can be controlled independently or collectively depending on the degrees of security desired. If independently controlled, then a telemetry signal must be sent to the electronic system 112 which then activates each electromechanical system 118*a&b* when its authorization code is sent to cause a transition in the electromechanical system's state. The two electromechanical system 118*a&b* are shown disposed on the top and bottom of the container 102.

Figure 1E:
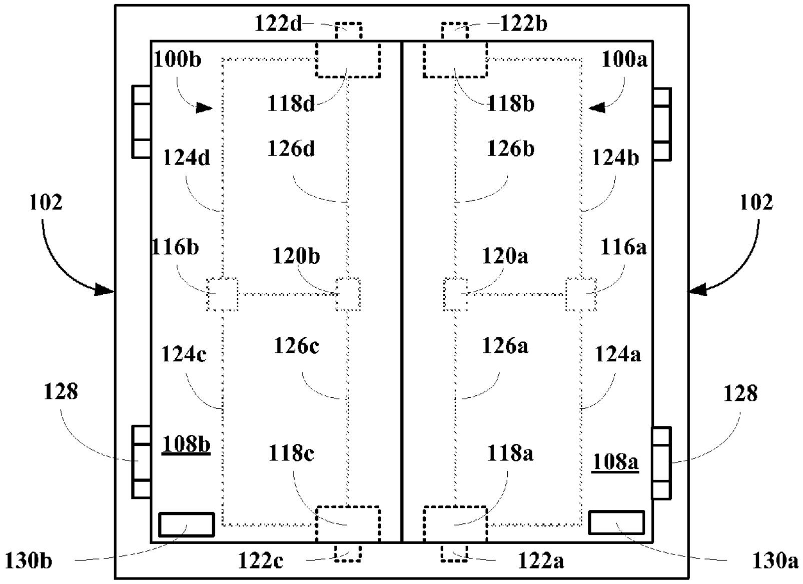
Figure 1F:
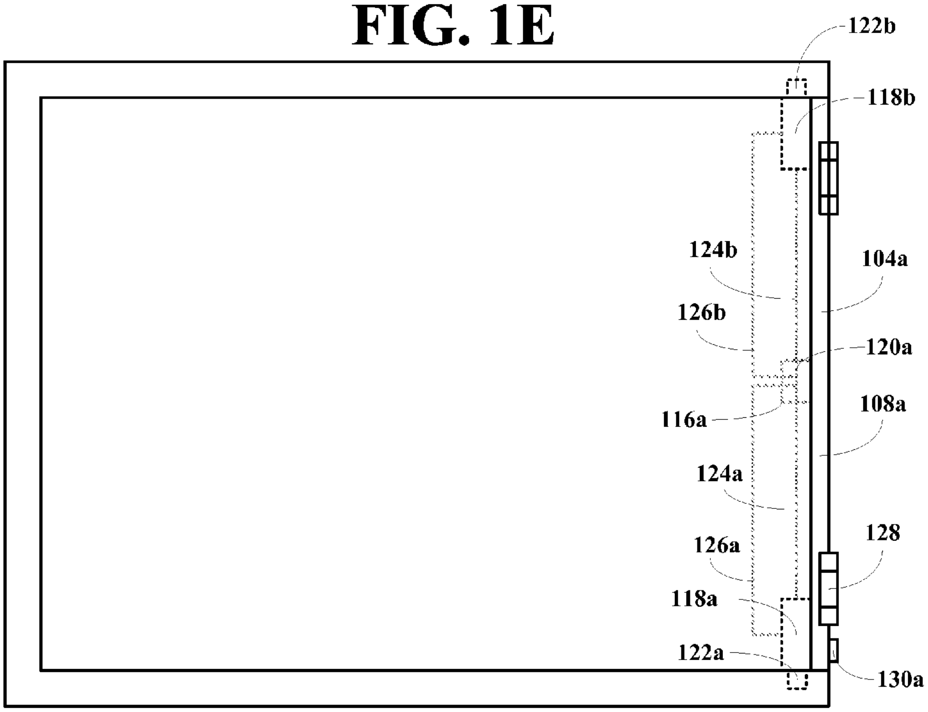

Referring now to FIGS. 1E&F, another preferred embodiment of an internal locking apparatus, generally 100, is shown. Two apparatuses 100*a&b* are mounted within a container 102 on inner surfaces 104*a&b* of a double door 106 having doors 108*a&b*. The apparatus 100*a* includes a power supply 116a, two electro-mechanical systems 118*a&b*, and an electronic control system 120*a*. The electro-mechanical system 118*a&b* include a retractable locking member 122*a&b*, shown here extended into apertures 123*a&b* in the container 102. The power supply 116*a* is connected to the electro-mechanical systems 118*a&b* via electrical conduits 124*a&b*. The electro-mechanical systems 118*a&b* are connected to the electronic system 120*a* via electrical conduits 126*a&b*. The apparatus 100*b* includes a power supply 116*b*, two electro-mechanical systems 118*c&d*, and an electronic control system 120*b*. Each of the electro-mechanical systems 118*c&d* include a retractable locking member 122*c&d*. The power supply 116*b* is connected to the electro-mechanical systems 118*c&d* via electrical conduits 124*c&d*. The electro-mechanical systems 118*d&d* are connected to the electronic system 120*b* via electrical conduits 126*c&d*. The doors 108*a&b* are pivotally mounted on the container 102 via hinges 128. The apparatuses 100*a&b* each can also include an external electronic unit 130*a&b* in electrical communication with its respective electronic control system 120*a&b* and where the external electronic units 130*a&b* are adapted to allow a person to enter a code to direct the electronic control systems 120*a&b*, collectively or individually, to cause the electro-mechanical systems 118*a-d* to transition between their two states. The container 102 can be a truck trailer, a ship cargo container, or the like. The container 102 can be a truck trailer, a ship cargo container, or the like.

In this embodiment, each of the electromechanical systems 118*c-d* can be controlled independently or collectively depending on the degree of security desired. If independently controlled, then a telemetry signal must be sent to the electronic systems 120*a&b* which then activates each of electro-mechanical system 118*a-d* when its authorization code is sent to cause a transition in the electromechanical system's state. The two electromechanical systems 118*a&c* are shown disposed on bottoms 132*a&b* of the doors 108*a&b*; while the other two electro-mechanical systems 118*b&d* are shown disposed on tops 134*a&b* of the doors 108*a&b*.

Figure 2A:
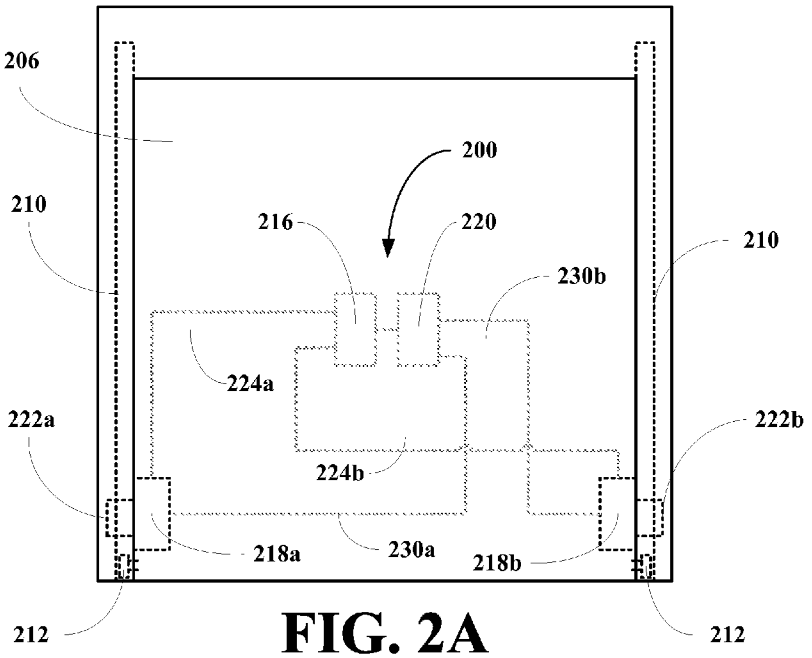
FIG. 2A&B depict another embodiment of a container internal locking system of this invention.
Figure 2B:
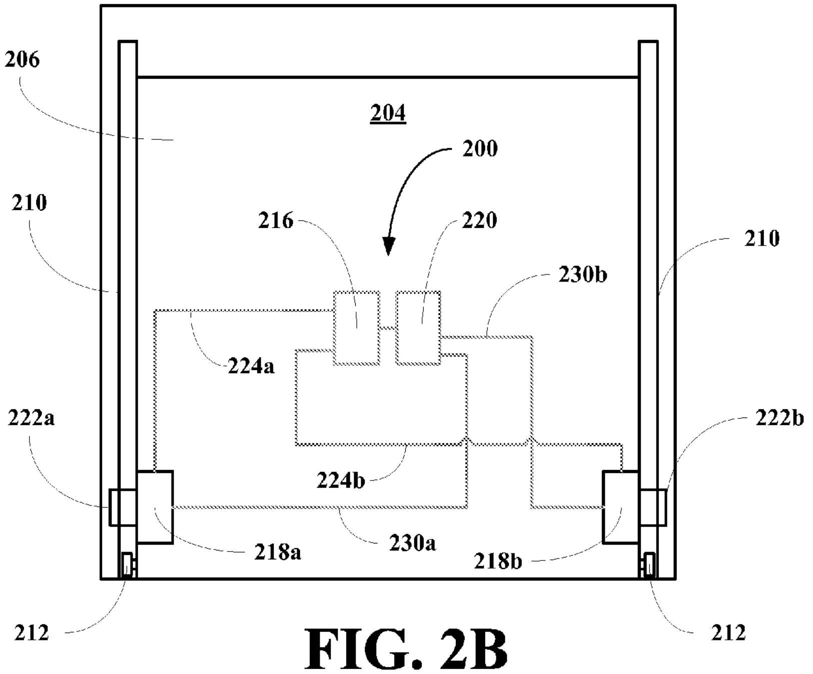
FIG. 2C&D depict another embodiment of a container internal locking system of this invention.
FIG. 2E&F depict another embodiment of a container internal locking system of this invention.

Referring now to FIGS. 2A&B, another preferred embodiment of an internal locking apparatus, generally 200, is shown. The apparatus 200 is mounted within a container 202 on an inner surface 204 of a sliding door 206, where the door 206 runs in a track 210 via wheels 212. The apparatus 200 includes a power supply 216, a left electro-mechanical system 218*a*, a right electro-mechanical system 218*b*, and an electronic control system 220. The electro-mechanical systems 218*a&b* include retractable locking members 222*a&b*, shown here extended into apertures 223*a&b* in the container 202. The power supply 216 is connected to the electro-mechanical systems 218*a&b* via electrical lines 224*a&b*. The electro-mechanical systems 218*a&b* are connected to the electronic system 220 via electrical wires 230*a&b*. The container 202 can be a truck trailer, a ship cargo container, or the like.

Figure 2C:
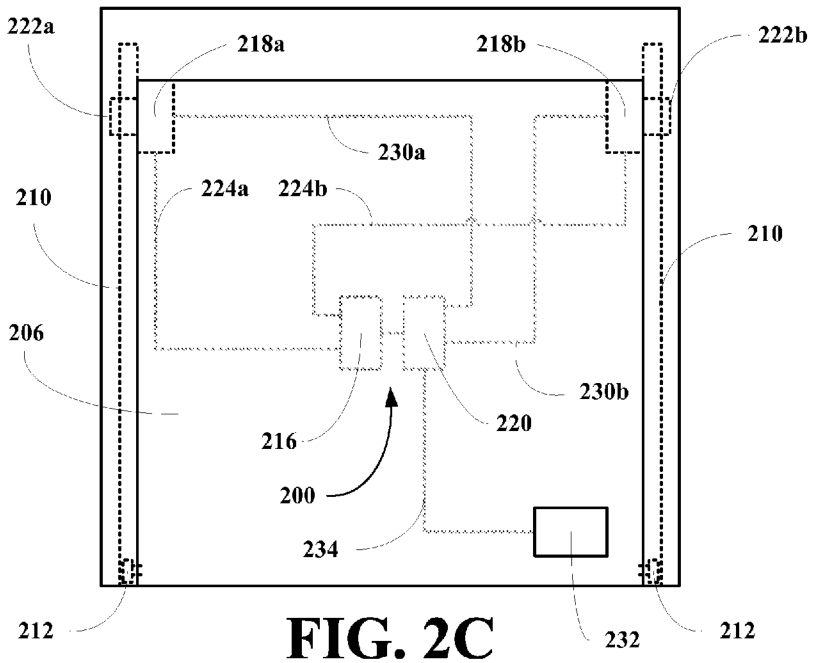
Figure 2D:
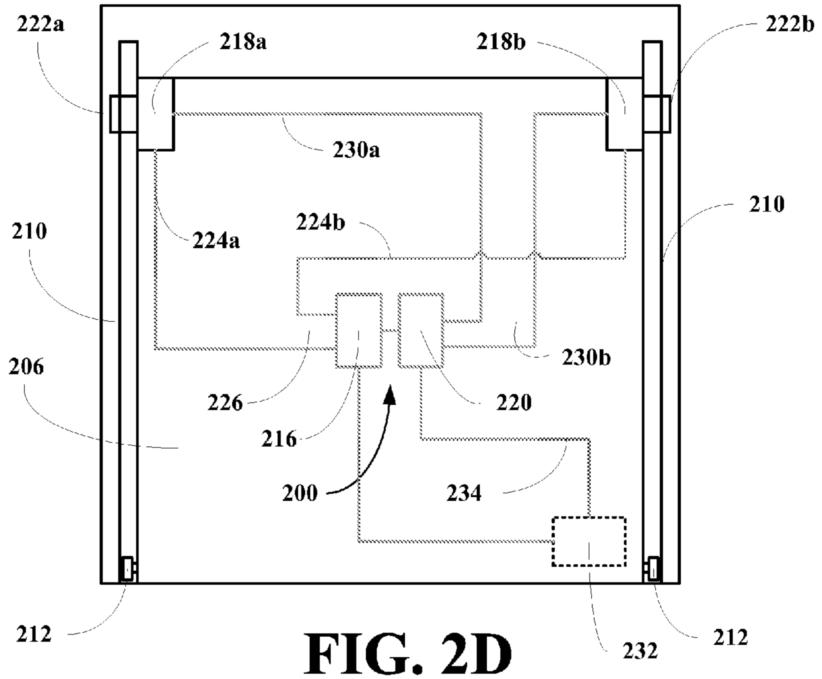

Referring now to FIGS. 2C&D, a preferred embodiment of an internal locking apparatus, generally 200, is shown. The apparatus 200 is mounted within a container 202 on an inner surface 204 of a sliding door 206, where the door 206 runs in a track 210 via wheels 212. The apparatus 200 includes a power supply 216, two electro-mechanical systems 218*a&b*, and an electronic control system 220. The power supply 216 is connected to the electro-mechanical systems 218*a&b* including retractable locking members 222*a&b*, shown here extended into apertures 223*a&b* in the container 202. The electro-mechanical systems 218*a&b* are connected to the electronic system 220 via electrical wires 228*a&b*. The electro-mechanical systems 218*a&b* are connected to the electronic system 220 via electrical wire 230*a&b*. The apparatus 200 can also include an external electronic unit 232 in electrical communication with the electronic control system 220 via a electric wire 234 and where the external electronic unit 232 is adapted to allow a person to enter a code to direct the electronic control system 220 to cause the electro-mechanical systems 218*a&b* to transition between their two states. The external electronic unit 232 can also be in electronic communication with the power supply 216 via an electric wire 236. The container 202 can be a truck trailer, a ship cargo container, or the like.

Figure 2E:
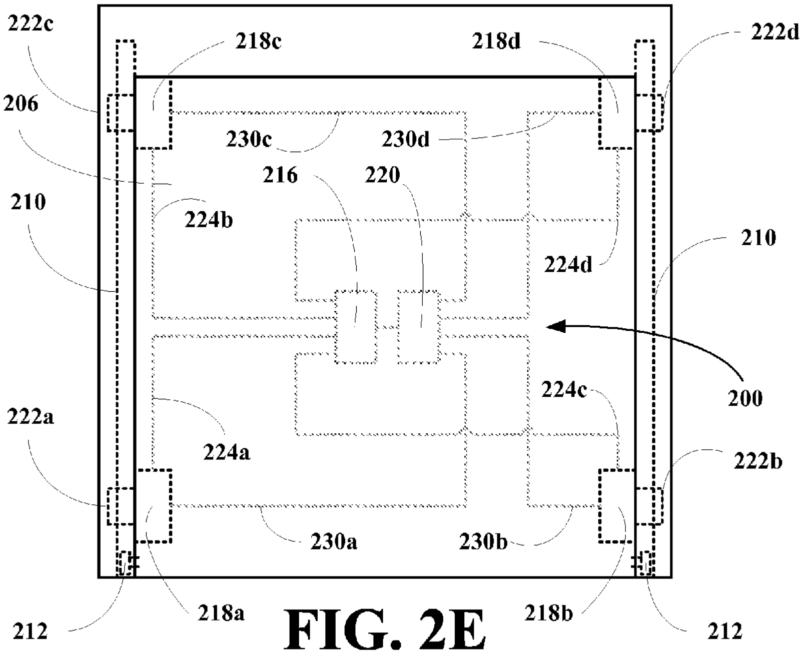
Figure 2F:
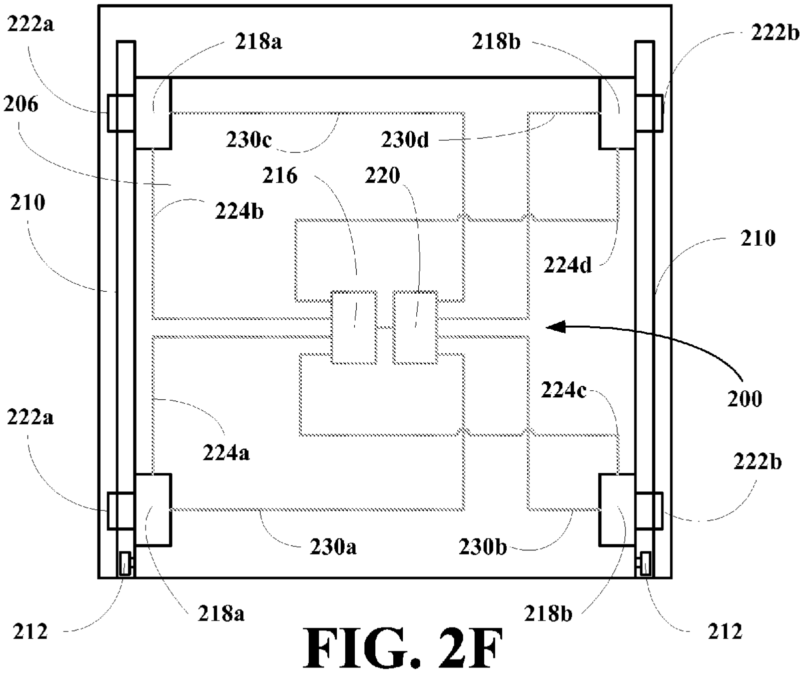

In this embodiment, the two electromechanical systems 218*a&b* can be controlled independently or collectively depending on the degrees of security desired. If independently controlled, then a telemetry signal must be sent to the electronic system 212 which then activates each electromechanical system 218*a&b* when its authorization code is sent to cause a transition in the electromechanical system's state. The two electromechanical system 218*a&b* are shown disposed Referring now to FIGS. 2E&F, a preferred embodiment of an internal locking apparatus, generally 200, is shown. The apparatus 200 is mounted within a container 202 on an inner surface 204 of a sliding door 206, where the door 206 runs in a track 210 via wheels 212. The apparatus 200 includes a power supply 216, four electro-mechanical systems 218*a-d*, and an electronic control system 220. The electro-mechanical systems 218*a-d* include retractable locking members 222*a-d*, shown here extended into apertures 223*a&b* in the container 202. The power supply 216 is connected to the electro-mechanical systems 218*a-d* via electric conduits 224*a-d*. The electro-mechanical systems 218*a-d* are connected to the electronic system 220 via electrical conduits 226*a-d*. The container 202 can be a truck trailer, a ship cargo container, or the like.

In this embodiment, each of the electromechanical systems 218*c-d* can be controlled independently or collectively depending on the degree of security desired. If independently controlled, then a telemetry signal must be sent to the electronic systems 220*a&b* which then activates each of electro-mechanical system 218*a-d* when its authorization code is sent to cause a transition in the electromechanical system's state. The two electromechanical systems 218*a&c* are shown disposed on bottoms 232*a&b* of the doors 208*a&b*; while the other two electro-mechanical systems 218*b&d* are shown disposed on tops 234*a&b* of the doors 208 *a&b*.

NEW DISCLOSURE OF THE INVENTION

High-Strength Composite Lock

The present invention also relates to a high-strength composite lock constructed from any high-strength composite material including, without limitation, high-strength polymeric composites with or without reinforcing member such as metal wires, carbon fibers, nanostructures or the like, high-strength ceramics, metals, or mixtures or combinations thereof. In any of these composite constructs, the constructs should have no internal voids or cavities and no external pockets to prevent insertion of an RF device permitting unauthorized operation of the lock. The lack of internal voids or external pockets will also prevent of wire-based devices to manually manipulate the microprocessor or electronics to result in the unauthorized and undetectable opening of the lock.

In certain embodiments, the present invention does not include any member that requires that a interior of the container be breached into order to install piece of equipment. As 60% of the domestic market constitutes leased trailer or containers and drilling into the trailer or container is cost prohibitive and potentially voids the lease agreement.

In certain embodiments, the present invention will include no powerjacks or external means for powering the lock. First, such power jacks require a breach of the trailer or container interior. Second, such jacks can readily act as communication channels for sending signals to the microprocessor. Communication jacks are not required if porting to the microprocessor.

In certain embodiments, the present invention includes an internal locking apparatus having a dual battery system, where the second battery is reserved specifically for opening of the lock in the case the first battery fails or is incapable of opening the lock. The microprocessor is programmed not to allow locking of the lock, if the second battery is below a set voltage parameter. Such a construct will generally negate the need for external power jacks. Moreover, the apparatus can include a second dual battery system as a redundant back up.

In certain embodiments of this invention, the locking apparatus will not include a solarpanel. The elimination or a solar panel will save penetration of the envelope of the trailer or container. In place of a solar panel, the microprocessor can be programmed to alarm when the dual battery pack needs to be replaced. In addition, a dual battery system is easier and cheaper to use because the drivers or container handlers can have spare battery packs, which are less expensive than maintaining a solar panel.

In certain embodiment, the locking apparatus of this invention only include a transmitter and not a receiver. Generally, devices having two-way communication capabilities are considerably more expensive and consumes more power; and are more prone to code manipulation defeating the integrity of the lock. If a receiver is includes, then the locking apparatus should only use two-way communication for immediate actions. Eliminating external power conduits and eliminating a receiver, will render the locking apparatus more tamper proof and less likely to be compromised by unauthorized personnel.

In certain embodiments of this invention, the locking apparatus will not include a keyfab and keypad device. In other embodiments, of the locking apparatus of this invention may include a magnetic sensor. Magnetic sensors are analog based devices and demand specific field strengths to operate, making them nearly impossible to replicate. The magnetic sensor is generally placed on an external surface of a trailer or container door. A combination is then dialed to activate the lock.

In certain embodiments of this invention, the locking apparatus includes a microprocessor encoded with a "bingo code," a code issued by the microprocessor every specified number of minutes based on an internal logarithm. The bingo code cannot be generated by unauthorized personnel, because such unauthorized personnel would have no means to communicate with the microprocessor, for apparatuses without receiver or external powerjacks or cables. Moreover, such unauthorized personnel would have no idea such a code was being transmitted. Under this scenario, if the bingo code is not transmitted, then the tracking portion of the apparatus would go into an alter or alarm state. Sometimes thieves or other unauthorized personnel will cover trailers or containers with a masking blanket to isolate communication. If the apparatus transmits a periodic bingo code, then the apparatus will be in an alert or alarm state after the bingo code time period has elapsed without receipt of a new code. Moreover, the code does not have to be rigidly periodic, but the code could transmit the bingo code and the delay for the next transmission.

In certain embodiments of this invention, the locking apparatus includes a microprocessor encoded with data logging capability. The data logging can use any cyfer code, especially known cyfer codes that are difficult if not impossible to break. In certain embodiments, the cyfer only uses 4 clock cycles per byte of data, leaving more cycles for processing data from the sensors.

In certain embodiments of this invention, the locking apparatus includes a colorimeter sensor disposed between a mounting plate and the lock to prevent switching of the lock with a duplicate lock during unloading and loading. A colorimeter is impossible to override, because the color changes when the real lock is removed from the mounting plate. The lock will then go into an audible alarm when removed.

In certain embodiments of this invention, the locking apparatus includes a full security system, a level 4 security system, that will facilitate sensor detection, communication, GPS tracking, data mining, and RFID.

In certain embodiments of this invention for level 1 security, the locking apparatus includes (a) high-strength composite housing & mounting plate; (b) microprocessor and controller, (c) battery and power management, (d) mechanical worm-drive as locking activator, (e) alarm annunciation, (f) lock activation and operation and (g) lock-tampering and detection.

In certain embodiments of this invention for level 4 security, the locking apparatus may also includes (h) sensors & detection, (i) GPS tracking, (j) wireless and/or satellite communication, (k) RFID (RF identification tags), and (l) data mining.

Design Considerations

In certain embodiments, the locking apparatus is constructed of a metal housing. The other embodiments, the housing is constructed of a high-strength composite using an injection molding process. The composite housing should have no voids or cavities on the interior to minimize tampering and manipulation of the lock. The material used in its construction should be high-strength, capable of withstanding shifting and impact of palletized cargo or other objects. The mounting plate design should avoid drilling into the container such that there is a penetration of the exterior skin. The mounting plate and lock should incorporate a sensor solution (such as a calorimeter sensor) to detect if the lock is swapped out for a clone when the doors are opened during loading/unloading of cargo. The housing may provide a communication type plug to interface its microprocessor with the Level 4 control panel.

In certain embodiments, the housing mount of the locking apparatus is designed so that the housing can only be inserted into the mount in an upward direction, i.e., the door to the container must be opened to insert the housing. This type of a mount is designed to preclude it from being removed without the door being already opened. The housing includes stainless steel locking pins to hold the unit in place. The Battery pack is inserted from the top of the unit. It is held in place by a simple quick release snap.

Figure 3A:
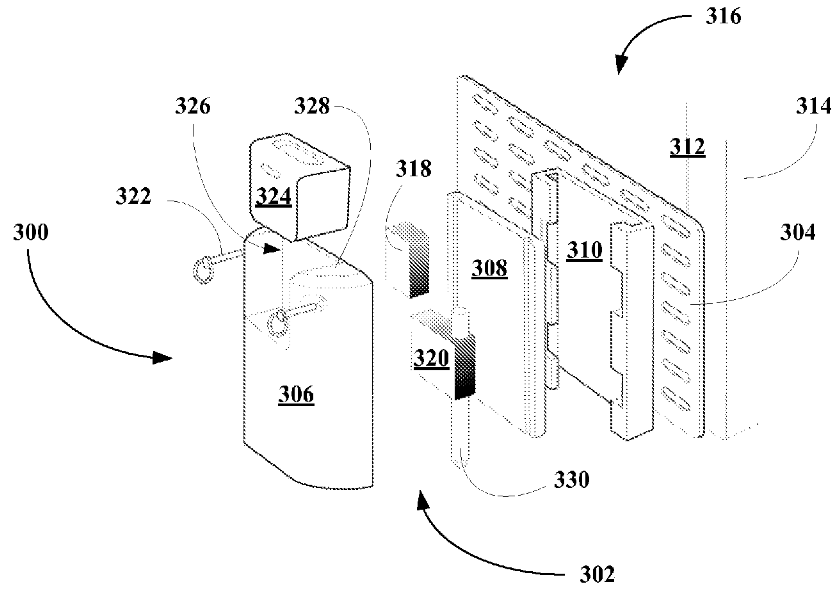

Referring now to FIG. 3A, another embodiment locking apparatus of this invention having level 1 functions and features, generally 300, is shown include a high-strength composite housing 302 and an optional mounting plate 304. The housing 302 includes a front cover 306 and a rear cover 308. The housing 302 is mounted on a metal bracket 310, which can be mounted directly on an inner surface 312 of a container door 314 of a container 316 or can be mounted to the optional mounting plate 304, which is in turn mounted to the inner surface 312 of the container door 314. The housing 302 is designed to house an electronic control unit 318 and a motor and worm drive unit 320. The front panel 306 is detachably connected to the rear panel 308 via pins 322. The apparatus 300 also includes a battery pack 324, which is designed to be snapped into a slot or groove 326 in a top 328 of the front panel 306. The apparatus 300 is designed to be attached to an inner surface 312 of a container door 314 so that a locking cylinder 330 of the worm drive unit 320 goes into a recess (not shown) in the container 316 to affect the locking of the container door 314.

Figure 3B:
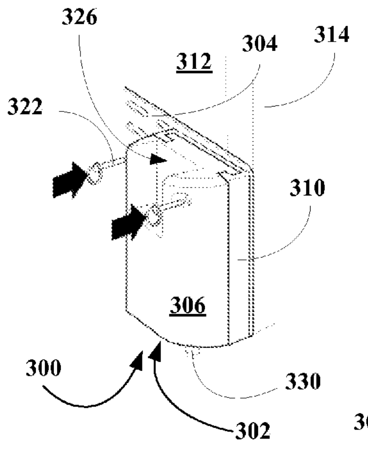
Figure 3C:
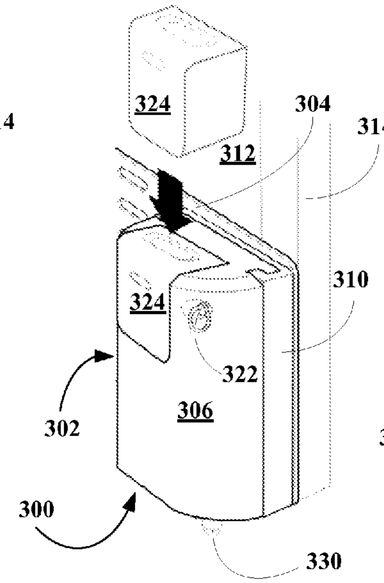
Figure 3D:
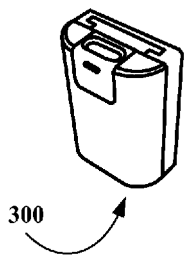

Looking at FIGS. 3B-D, the apparatus 300 is shown being assembled. In FIG. 3B, the housing 302 as it is being mounted onto the metal bracket 310, which is mounted on the optional mount plate 304, which is mounted on the inner surface 312 of the door 314 of the container 316. In FIG. 3C, the battery pack 324 is inserted into the groove 326. FIG. 3D shows a photograph of the apparatus 300 fully assembled.

Referring now to FIG. 4A, another locking apparatus of this invention, generally 400, is shown to include a locking assembly 402 and a battery pack 404. The battery pack 404 includes a housing 406 and a bottom connector 408. The locking assembly 402 includes a housing 410 having a top 412 including an assembly connector 414 designed to receive the battery pack connector 410. The housing 410 also includes a quick release 416 adapted to permit quick removal of the battery pack 404 for charging or replacement of the battery or batteries in the battery pack 404. The housings 406 and 410 also include outer rubber sheets or members 418 and 420 adapted to protect the assembly 402 and the battery pack 404, respectively. The members 418 and 420 are adapted to seal the assembly 402 and the pack 404 to keep out environmental moisture and/or other hazardous materials.

Referring now to FIG. 4B, the locking apparatus of this invention of FIG. 3, generally 450, is shown to include a locking assembly 452 and a battery pack 454. The locking assembly 452 includes a ribbed outer rubber sheet or member 456 adapted to protect the assembly 452. The members 466 is adapted to seal the assembly 452 to keep out environmental moisture and/or other hazardous materials and to provide greater protection due to the ribs.

The apparatus of FIGS. 3-5 are provides with two batteries. The primary battery is for the operation of the lock and a secondary battery to ensure there is a power supply to open the lock if the primary battery fails. The power management system is adapted to switch from the primary battery to the emergency backup battery, if the primary battery fails. The power management system is adapted to measure open-circuit voltage, loaded voltage, and coulometer measurements (ampere hour counting). If a lead-acid battery is used, the power management system may measure several of the following variables in assessing battery condition and performance: (a) charge-discharge time, (b) battery voltage, (c) PV voltage, (d) charging/discharging current, (e) electronic load voltage, (f) electrolyte temperature, and (g) ambient temperature. From the above measurements one can derive other values useful in determining battery health: (a) capacity (Ah), (b) energy, (c) internal resistance of the battery; and (d) increase of temperature of the central cell.

Referring now to FIG. 5, an expanded view of the battery pack of FIGS. 3 and 4B, generally 500, is shown to include a lateral sliding front panel 502 and a battery housing 504, where the sliding front panel 502 is slidingly mounted. The front panel 502 includes a digital battery power level indicator 506 and a handle 508 for each of ease of access and transportation. The battery pack 500 includes a battery 510 that fits within the housing 504. The battery 510 is a 12V DC power supply and can be a standard 12V motorcycle battery or any other compact 12V DC power supply. The battery pack 500 also includes a fool proof fail safe power supply 512 the acts as an emergency power source so that the lock can be opened if the battery 510 fails or has insufficient charge to open the lock. The power management system can be designed to use both the batter 510 and the fail safe power supply 512 to open the lock. The fail safe power supply 512 can be a POLAPULSE Power Pack manufactured by Polaroid or any other similar fail safe power supply.

Mechanical Worm-Drive Unit

Referring now to FIG. 6, a worm drive unit for use in the apparatuses of this invention, generally 600, is shown to include a drive assembly 602, a high RPM electric motor 604 and a drive shaft 606. The drive assembly 602 includes a drive gear 608 and a worm gear 610 comprising a portion of the drive shaft 606. The unit 600 also includes a bearing 612 at a rear 614 of the drive shaft 606 adapted to protect the shaft 606 from being forced backward. The drive gear 608 rotates the treaded worm gear 614 portion of the drive shaft 606 which forces the locking pin 616 to move between a locked state and an unlocked state. The high RPM electric motor 604 used to drive helical (worm gear) acts at 90° to the drive gear 608.

Alarm Annunciation

The locking system of this invention can also include a small horn internal to the lock to provide alarm notification. The small horn is adapted to provide audible indication for a defined event. The small horn is adapted to be mounted in housing to protect the device from forklifts and cargo. The following alarm notifications have been identified: (a) chirp indication, when the lock is in the fully extended position or locked position, (b) intermittent chirp, when the battery or batteries needs to be replaced and (c) constant alarm, if the lock indicates an unauthorized removal.

Lock Activation

As stated previously, in certain embodiments of the locking systems of this invention, a magnetic sensor/device that has a dial-combination (much like a traditional combination lock) is included with the system to provide a magnetic field variations for a magnetic sensor located in the lock housing. The system is programmed for a one-time combination for emergency use. For example: a shipping company may elect to place the control of opening and closing the lock in the hands of the dock/warehouse manager. The truck driver may not have the authorization to open the trailer. If the truck driver is pulled over by a law enforcement or customs officer and an inspection is required, the shipping company would send an emergency magnetic lock code to the truck so that the truck driver could unlock the lock. Once this number is used, the lock will never accept the same combination again. Other similar technologies for emergency access can be considered.

Lock-Tampering

In tamper proof embodiments of the locking systems of this invention, the system will not include any external jacks and devices breaching the interior of the container and connected electronically to the locking assembly electronics. By doing this, the only time the lock is vulnerable is when the trailer is opened during loading and unloading of cargo. The activity of concern is the replacement of the locking system of this with a clone that can be operated by remote control. In order to prevent or reduce such an occurrence, the systems can include a sensor located between the locking assembly and a mounting bracket or bracket and a door such that a duplicate sensor cannot create the same reading to the microprocessor. Color is almost impossible to detect and duplicate, especially in the field. Therefore, some type of colorimeter sensor such as a pressure sensitive sensor can be use to provide immediate indication when the lock has been removed or is being removed.

Level 4 Function & Features

In certain embodiments of the locking systems of this invention, the systems will include a level 4 security subsystem 140 of FIG. 1B. The security subsystem is adapted to provide customers the ability to detect, track and communicate with the locking system to ensure assets integrity and tracking. The subsystem may include at least: (a) sensors and detection electronics, (b) a global positioning sensor (GPS) for global tracking, (c) wireless and/or satellite communication hardware and software, (d) RFID chips or tags, and (e) the tracking software can have data mining routines associated to provide tracking data analysis. The systems of this invention including a security subsystem would generally include an additional unit 140 of FIG. 1B connected to the locking assembly electronics 120 via a cable 142, where the unit includes all the Level 4 functionality—sensors, electronics, transmitter and/or receivers and any external devices for RFID. The security unit may include: (a) GPS spoofing and alarm notification capability; (b) an unique "bingo" code transmitted at regular intervals or controlled intervals (interval length sent with the bingo code) to verify system integrity, (c) read, store and transmit inventory information in the container and will interface with devices that may already be in use by customers. The unit can include humidity sensors, temperature sensors, chemical species specific detectors or sensors (CO, hydrogen, hydrocarbon, $CO_2$, etc.), audio sensors, video sensors, IR sensors, UV sensors, cameras, or the like. The security subsystem can use the battery pack associated with the locking system or in certain embodiments, the security subsystem can have its own power supply system 144 of FIG. 1B. Moreover, the security subsystem can be mounted anywhere in the interior of the container. In most embodiments, the security subsystem would only include a transmitter and not a receiver so that the security system and locking system would be less vulnerable.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An apparatus further comprising:

a plurality of housings, where each housing includes:

a locking system comprising:

an electro-mechanical device and a retractable locking member, where the locking system is adapted to transition between a first state and a second state, a locked state and an unlocked state via the electro-mechanical device extending or retracting the member, an electronic control system, in electrical communication with the locking systems, including a command generator component adapted to generate and send commands to the locking systems causing the locking systems to transition between the two states, a transmitter component capable of transmitting: (1) an authentication signal upon receiving an authentication command from the command generation component, where authentication signal is adapted to authenticate a received activation signal, (2) a completion signal, (3) a state of the locking system during transportation, and (4) optionally a status signal of an intermittent, period, or continuous basis, a power supply comprising a primary battery, a secondary battery and power management system in electrical communication with the locking systems and the electronic control system and adapted to provide electric power to the locking systems and the electronic control system, and a magnetic sensor having a one time combination for unlocking the locking system upon receipt of the one time combination, where the housings include no internal voids or cavities to minimize tampering and manipulation of the locking systems, where the locking systems are mountable in an interior of a container in a spaced apart manner adjacent the openable member, where each locking system is capable of independently transitioning between the two states, where the container includes a plurality of apertures, one for each retractable locking members, and where the apertures are disposed in a spaced apart manner so that the apertures receive the members when the locking systems are in the locked state and where the secondary battery ensures there is sufficient power to open the locking system, if the primary battery fails or is incapable of opening the locking system, and where the power management system will not allow locking of the locking system, if the second battery is below a set voltage parameter.

2. The apparatus of claim 1, wherein the electronic control system further includes a receiver component capable of receiving an activation signal and/or a verification signal, where the activation signal causes the command generator component to issue a state transition command to the locking system and the verification signal causes the command generator component to issue an authentication command, and is adapted to issue commands to the plurality of locking systems to cause the locking systems to simultaneously or near simultaneously transition between the two states.

3. The apparatus of claim 1, wherein the electronic control system is adapted to issue commands to the plurality of locking systems to cause the locking systems to sequentially transition between the two states.

4. The apparatus of claim 1, further including a plurality of mounting plates adapted to be mounted onto the interior surface of the container, where each mounting plate is adapted to receive a locking system.

5. The apparatus of claim 1, wherein each locking system is contained in a housing.

* * * * *